Patented July 12, 1927.

1,635,812

UNITED STATES PATENT OFFICE.

NORRIS BOEHMER, OF MONTCLAIR, NEW JERSEY, ASSIGNOR TO CHADELOID CHEMICAL COMPANY, OF NEW YORK, N. Y., A CORPORATION OF WEST VIRGINIA.

CHLORINATED-RUBBER VARNISH.

No Drawing. Application filed August 26, 1924. Serial No. 734,329.

This invention relates to coating or impregnating compositions suitable for use on wood or metal forming a protective and water resistant film on the surface to which it is applied, such compositions containing chlorinated rubber and drying oils which are of a completely miscible and substantially stable character. The invention further relates to a varnish or coating composition whose content of chlorinated rubber is proportioned with respect to the degree of chlorination and to the degree of oxidation of a drying oil especially tung oil, that is to the extent to which the oil has been boiled.

I have made the discovery that in the case of tung oil and chlorinated rubber there exists a peculiar relationship which may be roughly expressed by the statement that for each degree of chlorination of the chlorinated rubber there exists a degree of oxidation or polymerization of the drying oil, (or whatever changes are produced by the heat treatment of tung oil,) within which clear stable solutions of the two may be prepared. Deviation from these conditions for any given degree of chlorination may result in turbid opaque solutions or even emulsions. Since in general a highly chlorinated rubber has a relatively high solubility and since a well boiled or "prepared" tung oil has more rapid drying qualities and other desirable qualifications, the preferred form of the invention embraces compositions containing such highly chlorinated rubber material incorporated with "prepared" tung oil, oxidized or polymerized to a maximum degree compatible with chlorinated rubber of that degree of chlorination.

More simply expressed, to make clear, permanent varnishes from chlorinated rubber and tung oil the time of cooking of the oil is reduced for low chlorination of the rubber and increased for high chlorination.

Chlorinated rubber is made by reacting on rubber, preferably crude or unvulcanized rubber, with chlorine and it may vary in its combined chlorine content from under 40 per cent to 70 per cent or more depending upon its mode of preparation and the use for which it is intended. All of these varieties are much more readily soluble than the untreated rubber, but the solutions vary greatly in viscosity as well as in other properties. Benzol and its homologues, toluol and xylol, as well as solvent naphtha are good solvents for chlorinated rubber. Other suitable materials are the chlorbenzols, carbon tetrachloride, carbon bisulphide, trichlorethylene and the like.

Solutions of chlorinated rubber in solvents such as those mentioned are suitable for use as varnishes, impregnating compositions etc., but for many purposes the addition of drying oils, particularly Chinese wood oil, or tung oil is desirable. Such additions improve the "body" of the varnish, as well as the water resistance and flowing qualities. When wood oil is employed it should preferably be that known to the trade as "prepared wood oil", made by heating the oil near its polymerization point and adding rosin or rosin derivatives, driers etc., since the untreated oil dries to a frosted or flat finish.

In the manufacture of the ordinary type of varnish, the resin used is, as a rule, first melted or "run" and the hot oil added thereto, after which the varnish is thinned to a suitable consistency. Chlorinated rubber may be considered to be substituted for the resin customarily employed in such compositions, but it has the advantage of being much tougher and harder than most resins. Since it does not melt, but is partially decomposed on strong heating, chlorinated rubber is incorporated by mixing its solution with the oil, either cold or at temperatures not substantially higher than 100° C., the solvent serving to replace a part of the thinner customarily employed.

In certain instances chlorinated rubber solutions may not be completely miscible with wood or tung oil. As stated above both the degree of chlorination of the rubber, and the extent to which the wood oil has been cooked or polymerized influence the compatibility of the two. Thus, solutions of those varieties which are of a lower degree of chlorination are comparatively viscous, and when agitated with wood oil which has been cooked until it is of a thick molasses-like consistency, or with "prepared" wood oil which together with cooking has been treated with rosin to prevent solidification, tend to give turbid or nearly opaque compositions which may separate into two layers upon standing for a time or upon centrifuging. On mixing solutions of chlorinated rubber of low chlorine content with slightly cooked wood oil the turbidity is slight or entirely absent and separation is not observed.

In producing a varnish it is highly desirable that it be substantially stable physically, that is that none of its essential constituents tend to separate or precipitate on storage, though some sedimentation and separation of dirt or other insoluble matter usually takes place. The more highly chlorinated varieties of chlorinated rubber, especially those containing 67 per cent or more of combined chlorine, form solutions which have viscosities materially lower than those varieties containing less chlorine, say 40 per cent to 50 per cent. Solutions of the highly chlorinated material form clear compositions which do not separate into two layers on standing, even when mixed with cooked or "prepared" wood oil. When applied to a surface as a varnish, a clear, bright, hard and elastic film results upon evaporation of the solvents and oxidation of the oil. The varnish is quick drying and water resistant.

The following is an illustrative example of the way in which varnishes such as are contemplated in this invention may be prepared, to the details of which it is, of course, not limited.

25 parts by weight of highly chlorinated rubber i. e. that containing 67% or more of chlorin, above mentioned, were dissolved in 50 parts by weight of solvent naphtha, and when solution was complete, 75 parts by weight of "prepared" wood oil were stirred in, no heat being employed in the process. The "prepared" wood oil was made by cooking the raw oil for 45 minutes at 200° C. after treatment with about 12 per cent of limed rosin. It contained no benzine or the like, being thinned with turpentine and solvent naphtha, since many aliphatic hydrocarbons tend to precipitate chlorinated rubber. The composition, after thorough mixing of the ingredients was allowed to stand for a time, in order that bubbles might escape, and any dirt or sediment settle. After this it was brushed on a wooden panel and found to give a hard, tough, clear and bright coating when dry. The surface dried "dust free" in less than two hours.

The proportion of oil utilized may vary within wide limits. Instead of wood oil, other miscible drying oils may be employed, such as linseed oil; or mixtures of oils may be used in place of any one oil. Resinates, tungates or other driers are useful and may be employed if desired. Likewise resins soluble in solvents for chlorinated rubber, or solubilized by cracking or "running" may be used in addition to, or partly substituted for, chlorinated rubber. Or the resin and oil may be combined by the usual gum-running process and the chlorinated rubber solution added thereto. The varnishes may be thinned with solvent naphtha, turpentine or other miscible thinners which do not precipitate chlorinated rubber. Antacids such as aniline, toluidine, urea and the like may be used to counteract any acid tendency of the chlorinated rubber. Softeners, such as triphenyl or tricresyl phosphates, diethylphthalate, etc. may be incorporated in some cases.

Pigments may be ground into the varnishes to form varnish paints or color varnishes or oil soluble dyes incorporated to make varnish stains.

The compositions involved in this invention may be applied by means of brushing, spraying, or dipping and dry by evaporation of the volatile solvent and thinner, and by oxidation of the oil.

In the foregoing, and in the appended claims, chlorinated rubber is referred to, but it is to be understood that the use, along with chlorine of bromine or other halogens, making a chlorinated product also having other halogens in combination is not precluded; since included within the purview of this invention are chlorinated rubber products or chlorinated rubber derivatives which may contain other elements than simply chlorine, carbon and hydrogen, all to such extent as such products function in a manner similar or analogous to true chlorinated rubber. Likewise in place of natural rubber artificial rubber may be employed in some cases as a basis for halogenation; or gutta percha, balata, etc. may be utilized.

What I claim is:—

1. A coating composition comprising highly chlorinated rubber, incorporated with prepared tung oil, oxidized or polymerized to a maximum degree compatible with chlorinated rubber of that degree of chlorination.

2. A liquid coating composition comprising a clear stable solution of chlorinated rubber incorporated with boiled drying oil, such oil being boiled to about the maximum degree compatible with the miscibility therewith of the specific chlorinated rubber employed.

NORRIS BOEHMER.